J. VORRABER.
BALL BEARING.
APPLICATION FILED MAY 28, 1913.
1,078,474.
Patented Nov. 11, 1913.
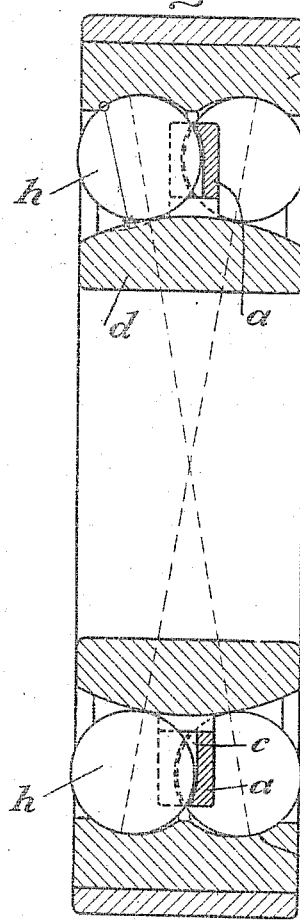
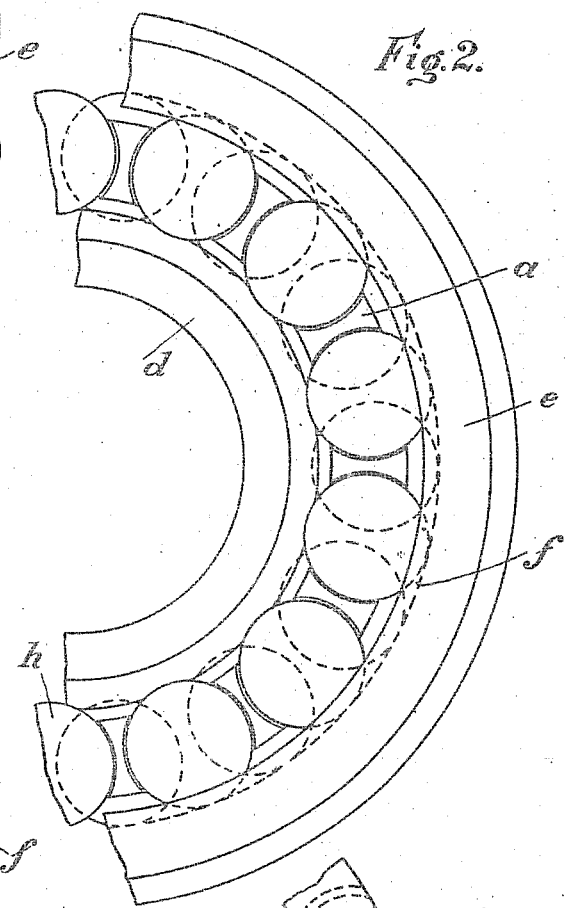
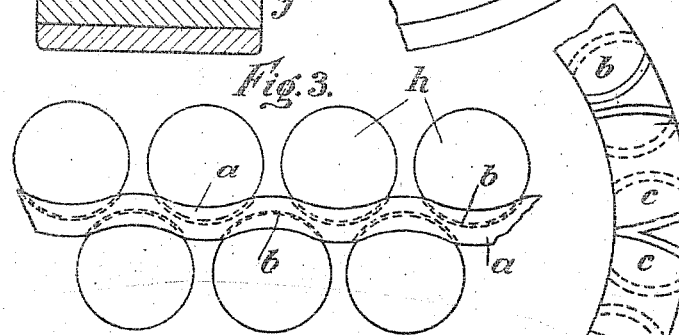
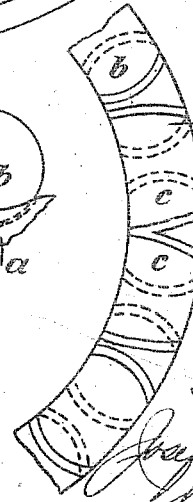

UNITED STATES PATENT OFFICE.

JOSEF VORRABER, OF FRANKFORT-ON-THE-ODER, GERMANY, ASSIGNOR TO MÄRKISCHE MASCHINENBAUANSTALT "TEUTONIA," GESELLSCHAFT MIT BESCHRÄNKTER HAFTUNG, OF FRANKFORT-ON-THE-ODER, GERMANY.

BALL-BEARING.

1,078,474.     Specification of Letters Patent.     Patented Nov. 11, 1913.

Application filed May 28, 1913. Serial No. 770,447.

*To all whom it may concern:*

Be it known that I, JOSEF VORRABER, a citizen of the Empire of Austria-Hungary, residing at Frankfort-on-the-Oder, in the Kingdom of Prussia, Germany, have invented certain new and useful Improvements in Ball-Bearings; and I do hereby declare the following to be a full, clear, and exact description of the invention, such as will enable others skilled in the art to which it appertains to make and use the same.

My invention relates to improvements in ball bearings, and more particularly in ball bearings, in which two sets of balls are disposed between an outer cylindrical member having grooves formed about the inner circumference, and an inner member having a circumferential outer surface, the sets of balls being separated by a ring located between the said sets. In known constructions of this class the said ring is formed at both sides with spherical cavities which are formed in such a way, that the balls bear on the said ring only with their neutral zones.

The object of the improvements is to provide a ball bearing of this class in which the balls can be brought into the space between the outer and inner rings, without providing a notch in the outer ring through which the balls can be passed.

With this object in view my invention consists in providing an intermediate ring in which at one side of the ring at least two diametrically opposite cavities are extended to the inner circumference of the ring, so that by temporarily omitting the balls belonging into the said extended cavities and filling only the other cavities a diametrical space is provided for inserting the spherical member with its plane perpendicular to the cylindrical bearing member.

For the purpose of explaining the invention an example embodying the same has been shown in the accompanying drawing, in which the same letters of reference have been used in all the views to indicate corresponding parts.

In said drawing—Figure 1, is a section of the ball bearing, Fig. 2, is a side view of a part thereof. Fig. 3, is a plan view of a few balls with the guiding ring placed between the balls of the two sets, and Fig. 4, is a partial side view of the guiding ring.

As shown in the drawing the ball bearing consists of an outer cylindrical ring $e$, an inner ring $d$ having a spherical outer bearing surface, a guiding ring $a$, and two sets of balls $h$ located one on opposite sides of the guiding ring. The guiding ring $a$ is made of a single piece of metal, such for example as cast metal, iron, or steel, and at one of its sides it is formed with spherical cavities $b$ all of which have the same depth. The radius of the curvature of the said cavities is slightly larger than the radius of the balls, so that the balls engage the ring exclusively with their neutral zones and a minimum of friction is produced. The opposite side of the guiding ring is likewise formed with spherical cavities $b$. However, at this side two or more cavities $c$ located diametrically opposite each other are flattened and broadened from their deepest parts to the inner circumference of the ring. Thereby I am enabled to insert the inner spherical ring $d$ into the bearing which is otherwise filled with balls and thereafter to fill in the last balls. Thereby, filling notches which in other constructions are provided in the bearing surface of the outer ring are avoided.

The parts of the ball bearing are put together in the following way: The outer bearing ring $e$ is temporarily placed on a subsidiary ring (not shown) which is so formed, that the lower set of balls $h$ is located on the said subsidiary ring the proper distance from the medium plane of the bearing ring $e$, and is also pressed in contact with its groove $f$ formed in the bearing surface of the outer ring $e$. After the guiding ring $a$ has been placed on the lower set of balls, the balls of the upper set are placed on the spherical cavities $b$ of the guiding ring, except however those balls which belong to the flattened cavities and which must temporarily be omitted, in order that the inner bearing ring can be inserted. Now the inner spherical bearing ring $d$ is inserted with its plane perpendicular to the plane of the guiding ring into the space provided by the cavities which are not provided with their balls, so that the said inner ring bears on the balls of the lower set. Thereupon the inner ring is turned about its vertical axis at an angle of about 90 degrees, and the last balls are brought into position from the inner side of the bearing. Finally the inner ring is turned about its horizontal axis at an angle of 90 degrees, so that it assumes its correct position within the ball bearing, which is now ready for use. For dismounting the ball bearing the same operation is repeated in the reverse order. Thereby I am enabled at any time to replace one or more of the balls by other ones in case of wear. If, as usual, the distance of the sets of balls is equal to the diameter of the balls, the cavities can be located so closely to one another, that there is not more clearance between the balls as is necessary to prevent the same from contacting with one another, and the bearing is practically completely filled with balls and has a maximum bearing capacity.

I claim herein as my invention:

1. In a ball bearing, the combination with two sets of balls, of an inner and outer bearing member, one of said members having a spherical bearing surface, and the other one having two circumferential spherical grooves corresponding to the diameter of the balls, and an intermediate ring placed between the sets of balls and having spherical cavities corresponding to the diameter of the balls, at least two diametrically opposite cavities at one side of the intermediate member being extended to the circumference of the intermediate ring which is adjacent to the spherical bearing surface.

2. In a ball bearing, the combination with two sets of balls, of an inner and outer bearing member, the inner one of said members having a spherical bearing surface and the outer one having two circumferential grooves corresponding to the diameter of the balls, and an intermediate ring placed between the sets of balls and having spherical cavities corresponding to the diameter of the balls, at least two diametrically opposite cavities at one side of the intermediate member being extended to the inner circumference of the intermediate ring.

In testimony whereof I hereunto affix my signature in the presence of two witnesses.

JOSEF VORRABER.

Witnesses:
   WOLDEMAR HAUPT,
   HENRY HASPER.